United States Patent [19]
Guon

[11] 3,950,152
[45] Apr. 13, 1976

[54] FILTER VAPOR TRAP

[75] Inventor: Jerold Guon, Canoga Park, Calif.

[73] Assignee: Rockwell International Corporation, El Segundo, Calif.

[22] Filed: Oct. 3, 1973

[21] Appl. No.: 402,937

Related U.S. Application Data

[63] Continuation-in-part of Ser. No. 311,085, Dec. 1, 1972, abandoned.

[52] U.S. Cl. .......................... 55/96; 55/97; 55/267; 55/521; 55/523; 55/524; 55/529
[51] Int. Cl............................................ B01d 46/04
[58] Field of Search ......... 55/97, 96, 268, 269, 259, 55/500, 521, 523, 529; 210/496, 487, 492

[56] References Cited
UNITED STATES PATENTS

| | | | |
|---|---|---|---|
| 2,076,304 | 4/1937 | Strindberg | 55/529 |
| 3,059,393 | 10/1962 | Allred | 55/523 |
| 3,066,462 | 12/1962 | Yap et al. | 55/542 |
| 3,524,548 | 8/1970 | McDonald et al. | 55/523 |
| 3,557,536 | 1/1971 | Ririe | 55/269 |
| 3,733,792 | 5/1973 | Taylor | 55/488 |

Primary Examiner—Bernard Nozick
Attorney, Agent, or Firm—L. Lee Humphries; Henry Kolin; Clark E. DeLarvin

[57] ABSTRACT

A sintered filter trap is adapted for insertion in a gas stream of sodium vapor to condense and deposit sodium thereon. The filter is heated and operated above the melting temperature of sodium, resulting in a more efficient means to remove sodium particulates from the effluent inert gas emanating from the surface of a liquid sodium pool. Preferably the filter leaves are precoated with a natrophobic coating such as tetracosane.

13 Claims, 5 Drawing Figures

FILTER VAPOR TRAP

The invention described herein was made in the course of or under a contract with the U.S. Atomic Energy Commission.

CROSS REFERENCES TO RELATED INVENTIONS

This application is a continuation-in-part of application Ser. No. 311,085, filed Dec. 1, 1972 and since abandoned.

BACKGROUND OF THE INVENTION

1. Field of the Invention

This invention relates to liquid metal traps or seals. It particularly relates to a filter trap for removing sodium vapor or finely divided sodium particulates from a stream of inert gas. Liquid metal vapor traps are of particular utility for use in liquid metal-cooled nuclear reactors, e.g., sodium-cooled fast breeder reactors. The term sodium vapor as used herein is also intended to include finely divided sodium particulate matter in the form of a fog or aerosol dispersion.

2. Description of the Prior Art

In a nuclear system utilizing liquid sodium as a coolant, circulation of an inert cover gas, such as argon, above the sodium pool leads to evaporation of the sodium. It therefore becomes a necessity to de-entrain the liquid metal coolant from the stream of inert gas to prevent circulation of the liquid metal with the inert gas. Otherwise, when the gas is cooled, deposition of the sodium on system components, such as gas feed pipes, would quickly clog these feed pipes. The purpose of the sodium vapor trap, therefore, is to de-entrain the sodium coolant from the inert gas in such a manner that long term operation of the system can continue without frequent shutdown.

There are a number of prior art vapor traps that serve to remove sodium particulates, as well as particulates of other liquid metals, from an effluent gas. These prior art devices rely primarily on adhesion of the particulates to some type of physical barrier.

A common type of vapor trap utilizes a woven wire filter consisting primarily of a spirally wound, woven wire mesh which is put into a vapor line. The individual layers in the mesh serve to obstruct the passage of sodium entrained in an inert gas. This particular type of vapor trap is very inefficient in that it does not trap all of the sodium in the effluent gas. In addition, the woven wire filter is easily clogged with sodium.

Another type of sodium vapor trap comprises a series of baffles in a container with apertures in each of the baffles, the baffles being stacked parallel to one another with spaces in between. The apertures in the baffles are non-aligned with each other so that the sodium particulate follows a tortuous path through the apertures in the stacked baffles. The sodium entrained in the effluent gases adheres to the surface of the baffle plates, thus removing the sodium from the carrier gases. This type of vapor trap is highly inefficient in that it does not trap all of the sodium in the effluent gases. Additionally, it also becomes easily clogged.

Yet another type of vapor trap utilizes a length of coiled tubing, the sodium vapor being directed to the inside of the coiled tubing in a vapor line. The sodium tends to adhere to the walls of the coiled tube as the vapors follow the tortuous path of the coil. This type of vapor trap is also found lacking in that it, too, can become easily clogged and, like the previously described sodium traps, it does not trap all of the sodium in the effluent gases.

Still another prior art vapor trap consists of a container filled with a multiplicity of "Raschig" rings. Such a trap is generally designated as a condenser vapor trap. The Raschig rings serve to obstruct the sodium in the effluent gases, the sodium adhering to both the outside and inside surfaces of the rings. The containers packed with Raschig rings do not remove all of the sodium in the effluent gases emanating from the molten sodium bath adjacent to the trap. Also, if improperly operated relative to its temperature distribution, the container can easily become clogged. The above four devices may be termed "depth processing" traps since they depend for operation on condensation of the particulates as the particulates incrementally pass through layer after layer of filter material.

An encouraging method for sodium particulate removal is one which involves a "surface process" of sodium particulate removal from the effluent gases. Such vapor traps utilize a series of stacked, sintered, porous discs, cylinders or other geometries in a sodium vapor line. These hollow stacked discs serve to de-entrain the vaporized or finely dispersed sodium from the effluent gases, primarily on the disc surfaces as the gases pass through the sintered disc stack. This type of filter vapor trap removes virtually all of the sodium particulates from the effluent gases by the build up of a cake layer of frozen sodium particles on the surface of the discs. However, as the cake builds in thickness, the cake collapses, compacting itself against the sintered discs, and with time blocking or clogging virtually all of the interstices in the disc, thereby preventing gas flow therethrough.

SUMMARY OF THE INVENTION

It is an object of this invention to provide a more efficient liquid metal vapor trap that will remove appreciably all of the sodium entrained in the effluent gas, while providing means and a method for preventing clogging of the interstices of the trap.

More specifically, it is an object of this invention to provide a sodium vapor trap wherein appreciably all of the sodium vapor or particulates are trapped from the effluent gases while allowing the cleansed gas to flow out of the vapor trap to be recirculated, or the like.

In accordance with this invention, effluent gas with liquid-metal particulates, e.g., sodium particulates, entrained therein is directed through porous metal filters in the form of hollow stacked discs, cylinders or other geometries. Little or no condensation is found to occur within the filter media, but rather on the surfaces of the stacked discs. After an initial conditioning period, no sodium fog or particulate can be detected downstream of the filter or sodium vapor trap seal system. However, the sintered filter discs rapidly become clogged with surface sodium if operated below the melting point of the sodium.

It has now been found as a characterizing feature of this invention that by utilizing a heat source, typically an electrically heated jacket, surrounding the vapor trap container which houses the stacked discs and maintaining within the container a temperature of between about 230° and 250°F (110°–120°C), the sodium-removing capability is quite dramatically increased. By maintaining the stacked, sintered discs at a temperature above the melting point of the sodium (98°C), it was found that the sodium entrained in the inert effluent gases, when meeting the warmed surface of the sintered discs, forms small globules, caused apparently by surface tension action, and that these globules tend to fall off the discs to the bottom of the vapor trap. This falling action of the sodium globules is enhanced by having the disc surfaces inclined. By having the vapor trap communicate with the sodium pool, the globules of sodium may, if so desired, be later drained back into the sodium pool.

It is a particularly preferred feature of this invention that the leaves of the filter discs, which are suitably and preferably of stainless steel, be precoated with a thin layer of an inert, adherent natrophobic material, i.e., one which is resistant to or avoids wetting by sodium. Thereby it has been found that the tendency of the sodium which is condensed on the surfaces of the filter discs to form into globules or drops is greatly enhanced, and the globulized sodium is thus more readily removed from the filter surfaces by the action of gravity, collecting in the bottom of the filter trap.

When the filter is operated at a temperature above the melting point of the sodium, the sodium globules which form on the surface of the sintered metal filter apparently allow the filter to breathe, thus leaving some of the interstices open to the effluent inert gas. Thereby the gas can be cleansed but still pass through the filter and out into the recirculation system. Thus the sodium does not build up on the surface of the filter disc as it does in the cold sintered filter trap system.

When the filter leaves are coated with a non-wetting coating, it is important that the surface of the leaves be covered with only a thin layer, which need not necessarily be a uniform coating. By providing a thin layer, there is no undue pressure drop across the filter versus the gas flow so that the filter may still be allowed to "breathe." Thus the thickness of the film should generally not be greater than about 100 microns, with a lower limit of about 100 angstroms. Ordinarily, not more than 0.2 mg of surface coating material is provided to cover about 65 cm$^2$ of apparent surface area. Since contamination of the gas stream is to be avoided, and long life operation is desired, the natrophobic material should be inert to attack by the sodium and have a low vapor pressure, generally below 1 micron of mercury, and preferably about 0.1 micron, at the temperature of operation of the filter. High-temperature adherence, ready availability, and convenience of application are also desired requisites for the coating material. Generally coating materials containing halogens or lead or aluminum salts are to be avoided in a sodium system. Illustrative of preferred natrophobic materials are the solid long-chain paraffin hydrocarbons, such as tetracosane ($C_{24}H_{50}$), or the high molecular weight alcohols and ethers. Also suitable for coating use are various non-toxic water-soluble silicone concentrates which are available for coating glass, ceramics, or metal with a microscopically thin, extremely hard, smooth sodium-repellent film to produce a drain-free surface. One such silicone material is available under the commercial trade name of "Siliclad." The solid paraffinic hydrocarbons are conveniently applied from a solution in an organic solvent, the solvent then being allowed to evaporate to deposit a thin coating. A paraffinic motor oil may also be used to provide a desired coating.

It is a further feature of the present invention that a mode of combined cold and hot operation of the filter may be utilized for certain applications. By utilizing cold filter operation, greater efficiency of sodium removal is obtained, but clogging of the filter interstices rapidly occurs. However, by then utilizing hot filter operation, i.e., filtering at a temperature above the melting point of the liquid metal, a purging or regeneration of the filter is obtained so that clogged portions of the filter are cleared, the liquid metal forming globules which readily drain from the surface. Thus while hot filter operation is an essential feature of the present invention, it may be utilized either as an exclusive mode of operation of the filter or as a means for purging a filter prior operated in a cold mode below the melting point of the liquid metal for a portion of the filter cycle.

Thus by practice of the present invention, particularly in its preferred embodiments, many significant advantages are realized over the prior art. Thus the present invention provides the ability to entrap all of the sodium entrained in an inert gas effluent, while passing the cleansed gas relatively uninhibited through the trap.

Another advantage over the prior art is the much more efficient manner in which the sodium is removed from the effluent gases, wherein heated surfaces are exposed to the sodium particulates, thus causing the sodium to melt and globulize as it strikes the surface; thereby, if so desired, enabling the sodium to drain back into the molten sodium pool.

Still another advantage over the prior art is the relatively long non-clogging life of the warmed sintered metal discs, particularly the coated discs, which means that the filter system need not be replaced as often as the prior art devices.

Another advantage over the prior art is that the heated sintered filter trap system, as opposed to a cold sintered filter system, can be substantially smaller than the latter which requires more filter area for removal of the same amount of sodium.

The above noted objects and advantages of the present invention will be more fully understood upon study of the following detailed description in conjunction with the detailed drawings.

DESCRIPTION OF THE PREFERRED EMBODIMENTS

In its broadest aspects the present invention is directed to removing entrained vapor particulates or aerosols of liquid metals from an effluent gas stream. However, it will be particularly described with respect to the removal of sodium vapor from an inert gas, such as is characteristic of a sodium cooled, fast breeder reactor system.

Figure 1:
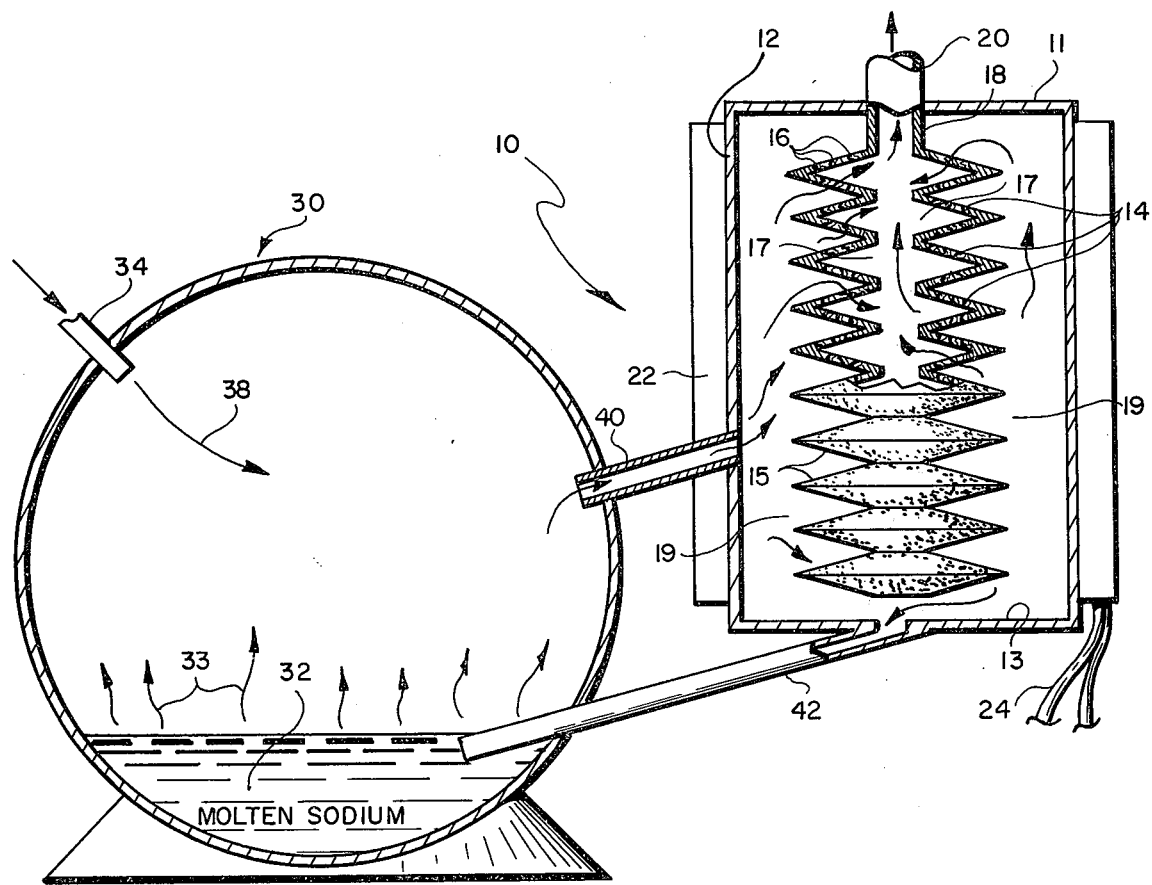
FIG. 1 is a schematic view of a liquid sodium system wherein the sodium vapor trap communicates with a main sodium source, the sodium trap serving to cleanse the effluent inert gases from the sodium entrained therein.

Referring to FIG. 1, the sodium vapor trap seal generally designated as 10 is comprised of a housing 12 which contains, for example, a series of stacked, sintered, porous, metal discs 14, typically made from stainless steel powder which has been sintered by standard powder metallurgical techniques. These discs may be uncoated, or preferably precoated with a thin layer of natrophobic material as will be hereinafter described. The discs 14 are connected to an inner internal pipe 18 which is affixed to the top 11 of housing 12. The end 20 of pipe 18 protrudes through the top of housing 12. Each of the sintered discs 14 defines a hollow chamber 17 which communicates with the interior of pipe 18. The surface 15 of the sintered discs 14 is porous with a multiplicity of random interstices 16 therethrough. The interstices 16 allow gas to pass from the interior 19 of housing 12 to the interior 17 of discs 14.

The porous stainless steel discs have a nominal pore size of between about 5 and 165 microns. For hot filtration a pore size of about 35 to 65 microns is suitable and preferred. Where cold filtration is a part of the filtration cycle, pore sizes of up to about 200 microns may be utilized. In the preferred practice of the present invention, the surface 15 of the sintered discs 14 is covered with a thin layer of a natrophobic coating (not shown) as previously described.

An electrically heated jacket 22, containing strip resistance heaters, completely surrounds and is adjacent to the outer surface of housing 12. Electrical leads 24 supply a source of electricity to provide heat for jacket 22. Other types of heaters, such as flexible heater cable, may be employed to heat sodium trap 10.

The sodium vapor trap 10 communicates with a sodium pool housing generally designated as 30, which may be, for example, the core contaminant vessel for a liquid metal-cooled, fast breeder nuclear reactor. The vapor trap 10 communicates with housing 30 through an inert gas feed pipe 40. The sodium pool housing 30 contains a pool of molten liquid sodium 32. Leading into the sodium pool housing 30 is a gas inlet pipe 34 which feeds a source of inert gas, such as argon, into the interior of the sodium pool housing 30. In the fast breeder reactor the inert gas functions to prevent oxidation of the sodium coolant. Due to surface agitation, evaporation, and temperature-gradient induced fog formation, sodium particulates 33 are entrained in the effluent inert gases 38. The sodium particulates are in a liquid or vapor state while entrained in the inert gas in housing 30. The effluent gases with entrained sodium 33 therein are directed through the inert gas feed pipe 40 into the interior 19 of housing 12 of the sodium vapor trap 10. The sodium particulates 33 are directed onto the surfaces 15 of the sintered discs 14. The temperature within housing 12 is above the melting point of sodium but sufficiently low so that essentially all the sodium is in the liquid state. Typically, the sodium particles are less than five microns in diameter. The sodium particles adhere to the surface of the discs 14, while the effluent, cleansed, inert gas is directed through the interstices 16 towards the interior 17 of discs 14 and outwardly through oulet 20 of internal pipe 18 to a recirculation or disposal system (not shown).

Figure 2:
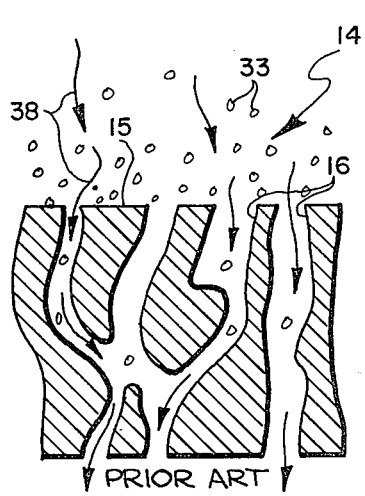
FIG. 2 is a schematic, partially cutaway, side elevational view of a cold sintered filter trap, indicating the process of the initial build up of sodium on the surface of the sintered filter.
Figure 3:
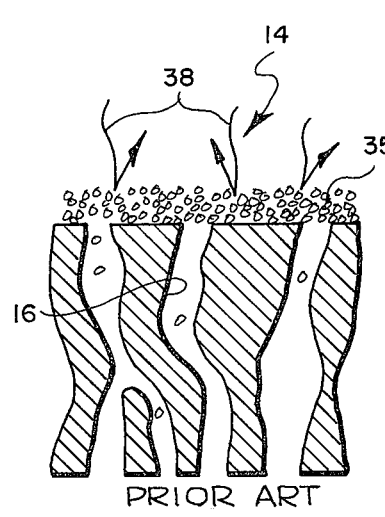
FIG. 3 is a schematic, partially cutaway, side elevational view of compacted sodium on the surface of the cold sintered disc blocking the interstices in the disc.

Referring to FIG. 2, if the discs 14 are allowed to remain "cold" (in a non-heated state), the sodium particles 33 are in the solid state and begin to build up on the surface 15 of the disc 14. Initially, the sodium particles are loosely distributed onto the surface 15 of disc 14. Thus, the effluent gas 38 can escape through the interstices 16 of disc 14. However, as shown in FIG. 3, the sodium particulate 33 builds up a cake 35 which eventually collapses due to mechanical forces induced by a pressure drop across the cake 35. The collapsed cake presents a very high resistance to flow of the effluent inert gas 38.

Figure 4:
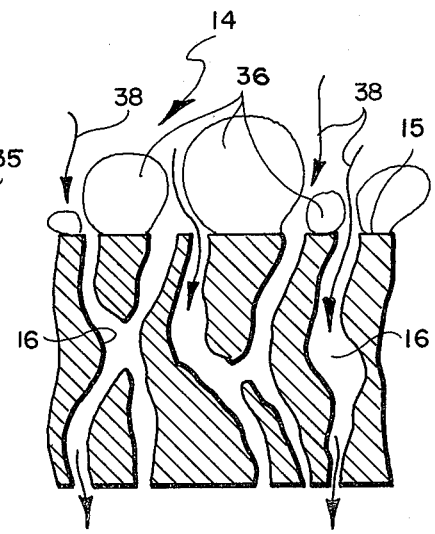
FIG. 4 is a schematic, partially cutaway, side elevational view of a preferred embodiment of the present invention wherein a warmed sintered disc causes the sodium to form globules on the surface of the sintered disc, the globules not covering all the interstices of the warmed discs, thus allowing the cleansed, inert, effluent gases to pass out of the filter trap.

FIG. 4 illustrates schematically what happens when the sintered discs 14, preferably coated with a natrophobic material, are heated by jacket 22 surrounding housing 12 of vapor trap 10 (FIG. 1). The porous sintered discs 14 are heated to a temperature of between about 230° and 250°F (110°–120°C), which is above the melting point of the sodium which otherwise would form a cake on the surface 15 of disc 14. The melting point of sodium is about 210°F (98°C). As a result, the sodium particulates 33 stay in a liquid state and form globules 36 of molten sodium on the surface 15 of porous disc 14. Surface tension apparently causes the molten sodium to form somewhat spherical globules 36 on the surface 15 of disc 14. While the globules adhere to surface 15, they do not cover all of the entrances to the interstices. Thus, each globule 36 enables effluent gas to pass around the globules through interstices 16. It can be seen then that while virtually all of the sodium is cleansed from the effluent gases, appreciably no clogging will occur to obstruct the passage of the cleansed gas.

During extended operation, the sodium particles adhere to surface 15 of warmed porous disc 14, as is described with reference to FIG. 4, and form globules 36 on the surface 15 of disc 14. The globules 36 gradually build up and fall by gravity to the bottom 13 of housing 12 shown in FIG. 1. The accumulated liquid sodium 32 may be returned through sodium return pipe 42 back to the molten sodium pool within the sodium pool housing 30. Hence, it can be seen that the warmed filter stack made up of the individual sintered discs 14 could last almost indefinitely since no build up of cake will occur on the surface 15 of disc 14 to clog the filter, as does occur with time on the cold filter stacks (FIG. 3).

Figure 5:
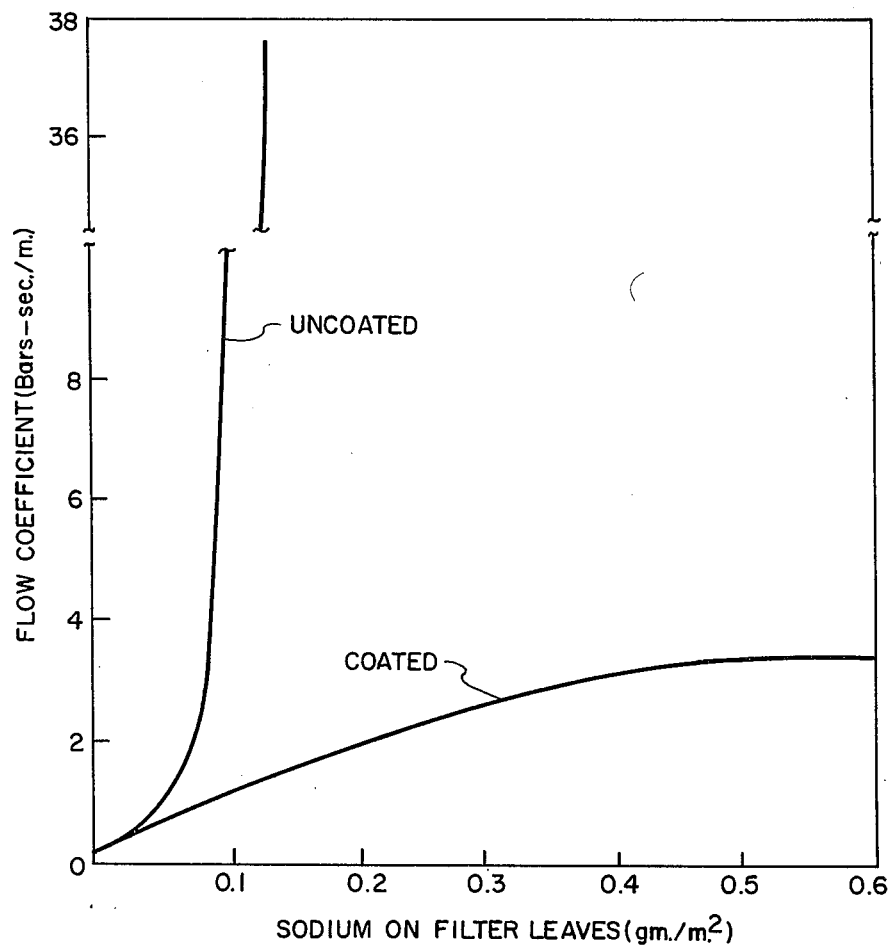
FIG. 5 is a graph showing a comparison of pressure drop through the filter trap as a function of sodium removal for coated and uncoated filter leaves.

In FIG. 5 is shown a graphical comparison of sodium "loading" versus flow coefficient for coated and uncoated filter leaves. The term loading refers to the surface concentration of alkali metal on the filter. The flow coefficient is a direct measure or indication of the pressure drop through the filter.

The filters containing the uncoated and coated leaves were both operated as warm filters, i.e., at a temperature above the melting point of sodium, e.g., at 115° ± 5°C. The uncoated filter was thoroughly degreased prior to use. A light loading of about 1.5 grams/1000 $cm^2$ rapidly occurred; at this point the pressure drop became excessive. By comparison, where the filter leaves were precoated with a thin microscopic coating of tetracosane, high sodium loadings in excess of 25 grams/1000 cm$^2$ were readily achieved, the flow coefficient increasing only slightly with increased loading of sodium on the filter leaves.

EXAMPLES

The following examples are illustrative of the present invention but are not intended to unduly limit its generally broad scope.

Cold Versus Warm Operation

Several series of comparative runs were made using identical stacks of sintered stainless steel filters. Typical filters contained from 12 to 36 leaves, providing respective areas of 1200 to 3600 cm$^2$. The cold-operated filters were operated at an ambient temperature ranging from 25°C to about 95°C. It was found that the cold filter stack having uncoated leaves removed only about 0.3 gram sodium/1000 cm$^2$ of filter area before excessive pressure drop (about 0.05 bar) occurred. When the filter leaves were coated with a thin microscopic coating of a natrophobic material, such as tetracosane, a silicone, or a motor oil, only a slight increase in loading was obtained for cold operation before the pressure drop became excessive.

When identical stacks of metal-sintered discs having uncoated leaves which had been first degreased by use of acetone or caustic were operated at a temperature of about 115°C, about 1.5 grams/1000 cm$^2$ was removed by the filter before the pressure drop became excessive. When these metal-sintered discs were coated in a similar manner as used for the cold-operated coated discs, and operated at a temperature of about 115°C, the sodium loading increased to greater than 45 grams/1000 cm$^2$ before the pressure drop became excessive. Thus under ideal conditions the warm vapor trap having coated elements in this test removed sodium at a ratio 165 times greater than was removed by the cold trap. This represents a highly significant increase in sodium efficiency over conventional cold-operated filter vapor traps.

Warm Operation: Coated Versus Uncoated

Several different types of porous sintered metal filters, having both leaf and cylindrical geometries, were evaluated for warm operation. The nominal pore size of the tortuous path filter elements was 35 microns, and all tests were conducted at a temperature of 115° ± 5°C. The uncoated leaves and cylinders were first thoroughly degreased by treatment with either acetone or caustic. No significant differences were found in results obtained using different degreasing agents provided the degreasing treatment was complete.

The coated filters were prepared by first degreasing the filter leaves and cylinders in a similar manner as used for the uncoated filters. Then a suitable natrophobic coating was applied. In applying a tetracosane precoating, the parts were precoated by immersion in a room temperature tetracosane solution for at least five minutes. The solution was prepared by dissolving 0.1 gram tetracosane in 100 ml of an organic solvent, such as hexane or heptane. After immersion, the parts were air-dried at room temperature for at least three hours prior to use. In preparing the silicone solution, a concentration aqueous solution of a commercially available material Siliclad was diluted with distilled water, and the filter elements were immersed in this solution. Excess solution was drained off, and the filter elements were rinsed in distilled water. The filter parts were dried for at least 16 hours at a temperature of 120°–150°C. When a paraffinic motor oil (Gulf Crest C) was used as a precoating, the same procedure as used for tetracosane was followed, the oil being dissolved in an organic solvent and similarly applied.

In typical runs, the filters having uncoated leaves or cylinders had a sodium loading of about 1.5 grams/1000 cm$^2$ of filter area before excessive pressure drops (0.05 bar) were encountered. Whereas with the coated filters, sodium loadings ranging from 25 to 45 grams sodium/1000 cm$^2$ were obtained at pressure drops significantly below 0.05 bar, the tests being terminated prior to this point.

Combined Cold and Warm Operation

A leaf-type filter having uncoated filter leaves and a total surface area of 11,000 cm$^2$ was operated at an ambient temperature of about 25°C using an inert gas having a relatively small sodium content of relatively coarse sodium particles. Operation was terminated after eight months when the pressure drop reached 0.07 bar. The calculated loading at the point of excessive pressure drop was between 1 and 1.5 grams/1000 cm$^2$.

The filter was then maintained in place by heating the unit using external electrical heaters to a temperature of 120°C in the absence of gas flow. This temperature was maintained for three hours. The filter was then cooled to a temperature of about 75°C, at which point the flow of gas containing particulate sodium was then resumed. Cooling continued to an ambient temperature of about 25°C. It was found that the pressure drop fell from 0.07 bar (about 30 in. water) to about 0.003 bar (about 1 in. water). The run was continued for another month, with the filter being maintained at ambient temperature. At this stage the pressure drop had increased to 0.02 bar. Although this pressure drop was not considered excessive, the run was interrupted and a second warm maintenance cycle was used essentially similar to the first warm cycle previously used. The pressure drop after this warm cycle was only 0.003 bar. At this stage, the run was terminated and chemical analysis for sodium present on the filter leaves was made. A relatively high loading factor of about 18 grams/1000 cm$^2$ was found.

It is estimated that in the future operation of liquid sodium cooled nuclear reactors, porous sintered cold trap filter systems would require a filter change every three to six months depending upon the amount of sodium present in the cover gas. The old filters would than have to be completely cut from the radioactive nuclear feed pipe system and replaced with a new filter. This procedure necessitates shutdown of the reactor and requires that the old filters be disposed of as nuclear waste, a time-consuming and expensive procedure. Based on tests to date, the heated porous filter trap would last at least several cycles longer than a standard cold state-of-the-art filter trap (a cycle being the previously mentioned three to six months replacement period for the cold filter trap).

The mode of combined cold and warm operation of the filter traps offers certain advantages in that the cold cycle may be utilized for a much longer period of time than ordinarily feasible because of the use of a warm interim maintenance cycle. Such an arrangement is particularly advantageous in certain parts of the reactor where only a relatively small amount of sodium is entrained in the inert cover gas. However, these advantageous features may be offset, in certain nuclear applications, because of the additional requirements for close temperature control and alternating cyclic operation.

It will of course be realized that various modifications can be made in the design and operation of the present invention without departing from the spirit thereof. Other examples of filters that will work satisfactorily when heated are cylindrical geometry, star geometry, sintered fiber elements, and etched metal filters. Also, it would be obvious to replace the metal disc 14 with other types or geometric shapes of metallic porous material while still remaining within the scope of the present invention.

Also, where warm temperature operation is desired, i.e., operating above the melting point of the liquid metal coolant, the low melting alloy of sodium and potassium may be utilized and operation carried out at a temperature above the low melting point of this alloy. Other liquid coolants may be similarly utilized. Also, the advantageous features of applying a thin coating to the filter elements may be obtained with many other coating materials within the constraints as previously set forth. The essential characteristics required of the coating material is that it be essentially natrophobic with respect to sodium or non-wetting with respect to the liquid metal used so that globulizing occurs on the filter surfaces, thereby minimizing any clogging of the filter orifices. Thus while the presence of superficial surface contaminants may show such a globulizing effect, their presence would not ordinarily be desirable because of their contamination of the gas stream and the liquid metal pool.

Thus while the principle, preferred construction, and the mode of operation of the invention have been explained and what is now considered to represent its best embodiment has been illustrated and described, it should be understood that within the scope of the appended claims the invention may be practiced otherwise than as specifically illustrated and described.

I claim:

1. A method for cleansing entrained liquid metal particulates from an inert effluent gas emanating from a pool of liquid metal comprising the steps of
   a. providing a filter trap means, including a housing and a porous metal filter member having inner and outer surfaces contained within said housing, said inner surface defining a hollow chamber, said outer surface and said housing defining an inner zone,
   b. providing a natrophobic coating on one of said surfaces of said filter member,
   c. passing the inert gas containing the liquid metal particulates entrained therein into said filter trap means,
   d. impinging the inert gas upon the coated surface of said porous metal filter member, whereby the inert gas passes through said porous metal filter member,
   e. maintaining said filter trap means for a determined period of time at a temperature above the melting point of the liquid metal so that the liquid metal particulates are in a liquid phase upon their contacting the coated surface of said porous metal filter member whereby the liquid metal particulates contained in the inert gas are collected on the coated surface and form globules, and
   f. passing the inert gas cleansed of the liquid metal particulates out of said filter trap means.

2. The method of claim 1 wherein said natrophobic coating is tetracosane.

3. The method of claim 1 wherein said liquid metal is sodium.

4. The method of claim 3 wherein said filter trap means is maintained at a temperature between about 110° and 120°C.

5. The method of claim 3 wherein said filter trap means is alternately operated at ambient temperature below 95°C, followed by operation at a temperature between about 110° and 120°C.

6. The method of claim 3 further including the step of removing the collected liquid sodium from said filter trap means and returning it to said liquid sodium pool.

7. Apparatus for the removal of liquid metal particulates from a gaseous stream comprising
   a. a housing;
   b. a porous metal hollow filter member having inner and outer surfaces contained within and dividing said housing into inner and outer chambers, said inner surface defining the inner chamber, said outer surface and said housing defining the outer chamber;
   c. a first conduit means providing communication between a point exterior to the housing and said outer chamber;
   d. a second conduit means providing communication between a point exterior to said housing and said inner chamber;
   e. a heating means associated with said housing and said filter member to heat said housing and said porous metal filter member to a temperature above the melting temperature of the liquid metal particulates, and
   f. a natrophobic coating on one of said surfaces of said filter member, whereby when the liquid metal particulate containing gas impinges upon said natrophobic coated surface of said porous filter member, the gas passes through the filter member and the liquid metal collects upon the coated surface in the form of globules which have a substantially reduced tendency to block flow through said porous metal filter member.

8. The apparatus of claim 7 wherein the natrophobic coating is a coating of tetracosane.

9. The apparatus of claim 7 wherein said heating means includes a heated jacket surrounding said housing.

10. The apparatus of claim 7 wherein said porous metal filter member comprises a plurality of porous metal discs superimposed on one another.

11. The apparatus of claim 10 wherein said porous metal discs are sintered stainless steel discs having a nominal pore size of from about 5 microns to about 165 microns and said natrophobic coating has a thickness within the range of from about 100 angstroms to about 100 microns.

12. The apparatus of claim 7 wherein the coated surface of the porous metal filter member is inclined whereby globules formed thereon are removed by the action of gravity.

13. The apparatus of claim 12 wherein said porous metal filter member is in the form of a bellows.

* * * * *